United States Patent
Taneja (10) Patent No.: US 7,480,488 B2
(45) Date of Patent: Jan. 20, 2009

(54) PROVIDING OPTIMAL UPLINK DATA RATES TO MOBILE STATIONS WHEN MOBILE NETWORKS SEND PARAMETERS CONTROLLING THE DATA RATES

(75) Inventor: Mukesh Taneja, Jaipur (IN)

(73) Assignee: Texas Instruments Incorporated, Dallas, TX (US)

( * ) Notice: Subject to any disclaimer, the term of this patent is extended or adjusted under 35 U.S.C. 154(b) by 67 days.

(21) Appl. No.: 11/194,519

(22) Filed: Aug. 2, 2005

(65) Prior Publication Data

US 2007/0032200 A1   Feb. 8, 2007

(51) Int. Cl.
*H04B 1/00* (2006.01)
*H04B 7/00* (2006.01)

(52) U.S. Cl. .................. 455/69; 455/68; 455/452.1; 455/452.2; 455/453; 455/67.11; 455/67.13; 455/522; 370/252; 370/329; 370/332; 370/465

(58) Field of Classification Search ......... 455/418–420, 455/423–425, 452.1–2, 453, 67.11, 13, 68–69, 455/522, 67.13, 561; 370/252–253, 464–468, 370/329–336

See application file for complete search history.

(56) References Cited

U.S. PATENT DOCUMENTS 6,256,487 B1 *  7/2001  Bruhn ..................... 455/352

| | | |
|---|---|---|
| 2003/0198204 A1 | 10/2003 | Taneja et al. |
| 2004/0013089 A1 | 1/2004 | Taneja et al. |
| 2004/0042394 A1 * | 3/2004 | Nielsen et al. ............... 370/218 |
| 2004/0095960 A1 * | 5/2004 | Attar et al. .................. 370/468 |
| 2004/0213182 A1 * | 10/2004 | Huh et al. .................... 370/332 |
| 2007/0268860 A1 | 11/2007 | Taneja |

OTHER PUBLICATIONS

An Algorithm for Reverse Traffic Channel Control for CDMA 2000 High Rate Packet Data Systems published on May 2001, p. 1-5.*
Sumantra Chakravarty, Rajesh Pankaj and Eduardo Esteves "An Algorithm for Reverse Traffic Channel Rate Control for cdma2000 High Rate Packet Data Systems", http://www.qualcomm.com/technology/1xev-do/publishedpapers/RTCRC_CDMA2000.pdf, Qualcomm Incorporated, pp. 1-5, 2001, San Diego, CA.

* cited by examiner

*Primary Examiner*—Tuan A Tran
(74) *Attorney, Agent, or Firm*—Ronald O. Neerings; Wade James Brady, III; Frederick J. Telecky, Jr.

(57) ABSTRACT

The uplink data rate is dynamically adjusted in a mobile station according to the mobile station's ability to meet QoS (quality of service) requirements of applications executing on the mobile station. In an embodiment, the transition probabilities received from a mobile network are first compensated according to the ability to meet QoS requirements, and the uplink data rate is then computed based on the compensated transition probabilities. According to another aspect of the present invention, the base station dynamically adjusts the transition probabilities based on delay bound requirement of packets and/or average delay or data flow rate requirement.

26 Claims, 2 Drawing Sheets

US 7,480,488 B2

PROVIDING OPTIMAL UPLINK DATA RATES TO MOBILE STATIONS WHEN MOBILE NETWORKS SEND PARAMETERS CONTROLLING THE DATA RATES

BACKGROUND OF THE INVENTION

1. Field of the Invention

The present invention relates to wireless communications, and more specifically to a method and apparatus for providing optimal uplink data rates to mobile stations when mobile networks send parameters controlling the data rates.

2. Related Art

Mobile networks are often used to provide communication between mobile devices. In general, mobile networks contain systems such as base stations which communicate over air with individual mobile devices using 3G and IEEE802 cellular technologies such as CDMA20001xEV, UMTS/HSDPA/HSUPA, IEEE802.16e/WiMAX. Additional communication infrastructure is provided to facilitate communication between distant mobile devices.

An often important consideration in mobile environments based on digital communication technologies is the rate (amount of data per unit time) at which a mobile station can send data to the mobile network. The data rate is generally referred to as uplink data rate. In general, a higher uplink data rate implies that the mobile station can transmit correspondingly more data per unit time (in the allocated time slots) to the mobile network.

Uplink data rates are often controlled by parameters received from mobile networks. For example, in the CDMA 2000 environment, a base station sends parameters known as reverse activity bit (indicating whether the uplink rate can be increased or decreased), rate limit (maximum rate at which the mobile station can transmit), and transition probabilities (indicating the probability with which the data rate can be increased or decreased) etc., which are then used by each receiving mobile station to determine the corresponding uplink data rate. The manner in which the parameters control the uplink data rate is described in further detail in a standard document entitled, "CDMA 2000 high rate Packet data air interface specification", available from Third Generation Partnership Project 2 (3GPP2).

There is a general need to provide optimal uplink data rate to mobile stations. Providing too high a data rate may be considered 'unfair' since the data rates of other mobile stations may be correspondingly reduced (to keep interference within manageable levels).

On the other hand, providing too small a data rate may lead to several disadvantages. For example, in situations in which several types of multi-media applications are supported in the mobile network and mobile stations, too low a bandwidth may impede the ability of mobile stations to provide desired quality of service (QoS) (e.g., low latency for voice or bursty/high transfers for data networks access applications) to different applications.

Accordingly, what is needed is a method and apparatus to provide optimal uplink data rate in environments such as those described above.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A mobile station provided according to an aspect of the present invention determines the uplink data rate based on present ability of the mobile station to meet the QoS requirements of individual applications, as well as the parameters (designed to control the uplink data rate) received from (and originating in) the mobile network. Due to the adjusted uplink data rate, the mobile station may be able to better meet the QoS requirements of the individual applications.

In an embodiment implemented in the context of CDMA 2000 architecture, the parameters received include reverse activity bit and rate limit noted above, and transition probabilities p and q (described below in further detail) specified for each flow supported by a mobile station. The present ability to meet the QoS requirements is based on the 1. wait time of packets in queues/flows of interest, 2. depth of queues of interest, 3. difference between the current data rate and the data rate potentially specified for individual application, and 4. number of failures to timely transmit packets in pre-specified prior duration.

According to another aspect of the present invention, the base station examines the queues to determine various parameters impacting the observed QoS, and dynamically adjusts the transition probabilities based on the determined parameters. In an embodiment, the parameters include delay bound requirement (maximum permissible delay in transporting the packet to the destination) of packets and/or average delay or data flow rate requirement.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
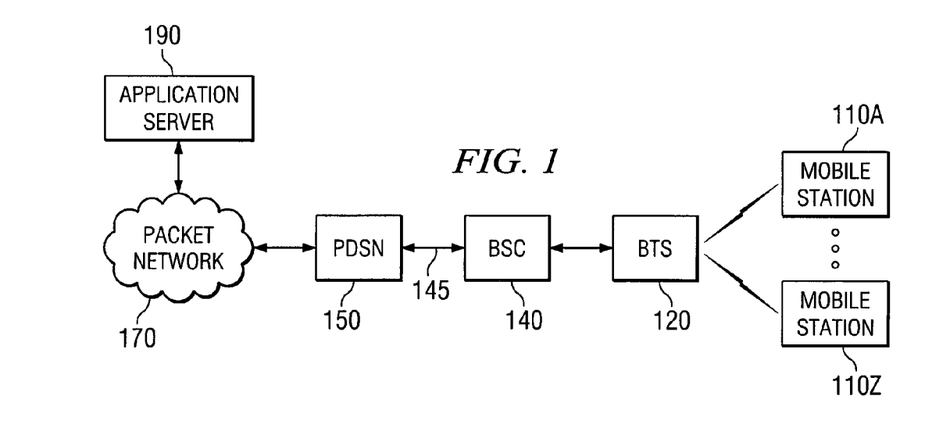
FIG. 1 is a block diagram illustrating an example environment in which several aspects of the present invention can be implemented.

FIG. 1 is a block diagram illustrating the details of an example mobile communications environment in which various aspects of the present invention can be implemented. The environment is shown containing mobile stations 110A and 110Z, base terminal station (BTS) 120, base station controller (BSC) 140, packet data serving node (PDSN) 150, packet network 170 and application server 190. Each system is described below in further detail.

At least from the description below, it may be appreciated that BSC 140 and BTS 120 form part of a mobile network, packet network 170 operates according to protocols such as Internet Protocol (IP), and that PDSN 150 provides the necessary interface between the mobile network and the packet network. Only example systems are included in the Figure for illustration. Typical environments contain many more systems, for example to provide voice telephone calls to distant users over PSTN network or another mobile network.

In addition, only the details of various systems as relevant to an understanding of various features of the present invention are provided herein for conciseness. In an embodiment, the mobile network is implemented consistent with the CDMA 2000 architecture, the data from/to application server 190 is encoded according to IS856 standard in the mobile network, and according to Internet Protocol in packet network 170. For further details, the reader is referred to the corresponding standard documents.

Mobile stations 110A through 110Z provide wireless communications to mobile users by interfacing with the mobile network. The description below is provided with reference to mobile station 110A for conciseness. However, the description relates to other mobile stations as well.

Application server 190 provides several services, which can be accessed via packet network 170. For example, application server 190 may correspond to a web server which receives HTTP requests and provides the corresponding data in the form of web pages. Packet network 170 provides transport for various data packets, and can be implemented according to protocols such as Internet Protocol and ATM, as is well known in the relevant arts.

PDSN 150 performs the necessary protocol translations in transferring data between packet network 170 and the mobile network. For example, the data in the payload of the data packets received from packet network 170 may be encoded in radio packets consistent with the protocol requirements of the mobile network, and provided to BSC 140. Similarly, the data in the radio packets received from BSC 140 is encoded in the payload of data packets suitable for transmission on packet network 170.

BSC 140 controls the operation of several base terminal stations, though only one base terminal station is shown for conciseness. BSC 140 provides features such as radio access (i.e., access to mobile stations) and link maintenance (soft handoff when mobile station moves from one cell to the other). In addition, the radio packets to/from application server 190 are also forwarded.

BTS 120 provides the radio link for communication with mobile stations 110A through 110Z. BTS 120 also sends various parameters which control the uplink data rate from each mobile station. However, various aspects of the present invention adjust the uplink data rate based on other factors also, as described below in further detail.

3. Providing Optimal Uplink Data Rate

Figure 2:
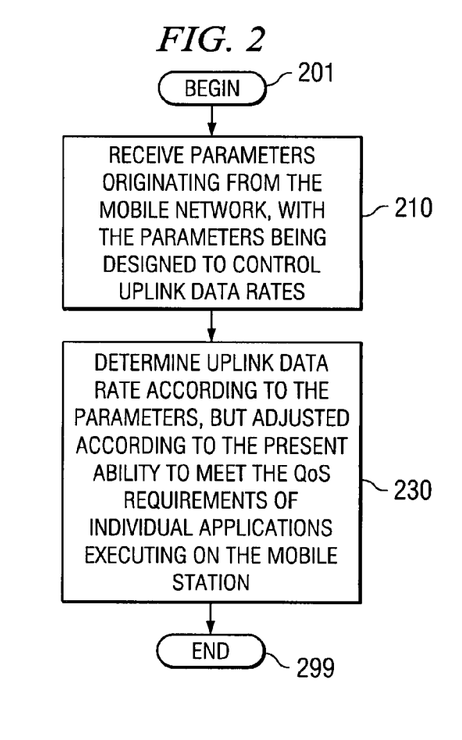
FIG. 2 is a flowchart illustrating the manner in which uplink data rate is updated according an aspect of the present invention.

FIG. 2 is a flowchart illustrating the manner in which optimal uplink data rates may be provided to mobile stations according to an aspect of the present invention. The flowchart is described with respect to FIG. 1 and CDMA 2000 architecture merely for illustration. However, the approaches can be implemented in other environments as well. The flowchart begins in step 201, in which control passes to step 210.

In step 210, mobile station 110A receives parameters originating from the mobile network, with the parameters being designed to control uplink data rates. For example, BSC 140 in combination with BTS 120 (collectively referred to as a base station, BS) may generate the control parameters based on the overall traffic in the mobile cell, and the parameters may be received via BTS 120. In the case of CDMA 2000, the parameters include reverse activity bit, rate limit, and transition probabilities p and q which are described in a section below briefly.

In step 230, mobile station 110A determines the uplink data rate according to the parameters, but adjusted according to the present ability to meet the QoS requirements of individual applications presently executing on the mobile station. The present ability may be determined based on present as well as past information. An example approach to such determination is described in sections below. The flowchart ends in step 299.

Due to such adjustment, various benefits such as meeting effectively the QoS requirements of various multimedia applications supported by mobile station 110A, may be obtained. In addition, given the shared nature of the aggregate bandwidth, higher uplink data rates may be used by mobile stations needing such higher rates due to the operation of various features of the present invention. Thus, the aggregate bandwidth may be more effectively utilized.

From the above, it may be appreciated that optimal uplink data rate may be used by mobile stations due to the operation of step 230. In one embodiment implemented in the context of CDMA 2000, the uplink data rate is determined by first compensating the parameters according to the present ability to meet the QoS requirements, and then using the compensated parameters to determine the uplink data rate. Accordingly, the parameters in such an environment are described first, followed by the manner in which the parameters are compensated.

4. Parameters in CDMA 2000

Broadly, there are four relevant parameters designed to control the uplink data rate in CDMA 2000. For conciseness, only a brief description of the parameters is provided. For further description of the parameters, the reader is referred to a document entitled, "CDMA 2000 high rate Packet data air interface specification" noted in sections above. Each parameter is described briefly.

A reverse activity (RA) bit indicates whether the total reverse traffic channel interference received in the cell exceeds a pre-specified value or not. Excessive interference generally implies that the uplink data rates need to be reduced so as to bring the interference to acceptable levels.

A rate limit indicates the maximum uplink data rate that might be used by a mobile station.

Transition probabilities (p and q) are specified for each flow in a mobile station and determine the probability with which the mobile station may decrease or increase the uplink data rate respectively.

In general, these four parameters are computed by BSC 120 and BTS 140 (together referred to as a base station) and transmitted to the mobile stations via BTS 120. As noted above, according to an aspect of the present invention, these parameters are compensated based on the present ability to provide desired QoS to applications locally in each mobile station. The compensation approaches generally depend on the internals of the corresponding mobile station, and accordingly the description, is continued with respect to the details of an example mobile station.

5. Mobile Station

Figure 3:
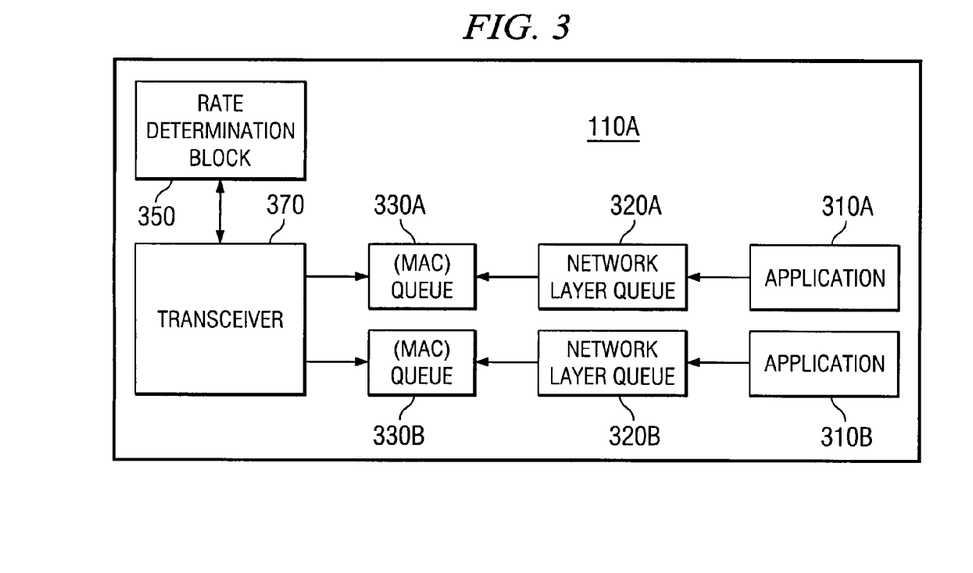
FIG. 3 is a block diagram illustrating the details of a mobile station in an embodiment of the present invention.

FIG. 3 is a block diagram illustrating the details of mobile station 110A in one embodiment. The mobile station is shown containing applications 310A and 310B, network layer queues 320A and 320B, media access control (MAC) queues 330A and 330B, rate determination block 350 and transceiver 370. Each block is described below in further detail.

Applications 310A and 310B represent example applications presently executing on mobile station 110A. For illustration, only two applications are shown, however, several more applications can be executing within mobile station 110A. It should be understood that different applications have different desired QoS. For example, the voice/video applications require low delay bound, low jitter and minimum required data rate, while some TCP applications such as web browsing perform better with lower average delay. FTP applications running over TCP may require some sort of throughput guarantees. In general, each application generates some network layer (e.g., IP) packets, which are to be transmitted to corresponding end system (e.g., application server 190).

Network layer queues 330A and 330B provide buffers to IP packets awaiting transmission from applications 310A and 310B. The packets are converted into a form (e.g., by segmentation into multiple MAC packets according to specification entitled, "TSG-C C.S0003-D v1.0" available from Third Generation Partnership Project 2 (3GPP2)) suitable for transmission on mobile network (to BTS 120) and stored in corresponding MAC layer queue. Thus, MAC packets corresponding to network layer queues 330A and 330B are respectively stored in MAC layer queues 330A and 330B.

A retransmit queue is also associated with each transmit MAC queue. The queue contains the MAC packets which need to be transmitted again, for example, because BTS 120 requests for retransmission.

Transceiver 370 transmits a next MAC packet from a specific queue 330A/330B once the mobile network indicates that the mobile station can transmit in the present time slot. A mobile station may send data from a desired flow in that time slot. Multiple mobile stations may send data in uplink in the same time slot. If the mobile network indicates to mobile 110-A that it is allowed to send data in a specific slot, this mobile 110-A can send data from 330A and/or 330B. The rate of transmission is determined by rate determination block 350. The manner in which rate determination block 350 determines the uplink data rate according to various aspects of the present invention, is described below. However, it is helpful to first establish some terminology to describe the related approaches.

6. Terminology

It is first helpful to note that multiple mobile stations generally interact with a mobile network, and each mobile station may contain multiple flows. For example, with respect to FIG. 3, two flows are corresponding to the two applications respectively.

$rf_{d,jt}$[m, z] represents a delay (d) and jitter (jt) sensitive reverse link flow (rf) corresponding to flow m within mobile station z.

dbound(m, z) represents the delay bound requirement of reverse link flow (m) of mobile station (z) over the air-interface between mobile station and BTS. This term indicates the maximum amount of time delay (from the time placed in queue 320A/320B) permissible in transmission of IP packets from mobile station 110A to BTS and may be set by the mobile station based on the QoS requirements for this flow (or the supported application in general). An application may have an end-to-end delay requirement (from mobile station to another mobile station or an application server) and dbound (m, z) represents the delay bound requirement over the air-interface between mobile station to BTS.

djitter(m, z) is the delay jitter of reverse link flow m of mobile station z. This term indicates the maximum permissible delay variation experienced by any two consecutive IP packets and may be set by the mobile station based on the QoS requirements for this flow.

$rf_{d,jt}$[p; m, z] denotes IP packet (p) of flow $rf_{(d,jt)}$[m, z].

$rf_{d,jt}$[k,p; m, z] denotes MAC packet (k) of IP packet p, wherein k can take integer values ranging from 1 to x(p) where x(p) denotes the number of MAC packets that IP packet p has been segmented into.

buff_$rf_{d,jt}$[n; m, z] denotes the buffer depth/length of MAC packet queue of reverse link flow m of mobile station z at the beginning of slot n.

p(m, z)[n] and q(m, z)[n] represent the transition probabilities p and q received from the mobile network at time slot n.

$p_{AT}$(m, z)[n] and $q_{AT}$(m, z)[n] represent the compensated transition probabilities p and q at time slot n, determined at the mobile station.

$p_{base}$(m, z)[n] and $q_{base}$(m, z)[n] represent the initial (prior to present recomputation) values of the transition probabilities for reverse-link flow m of mobile station z, that are determined in the mobile network.

wait(m, z)[h,n] represents the duration of time that MAC packet h of flow m of mobile station z has been in its queue by the beginning of time slot n.

Time slot $n_{prev}$ represents a time slot prior to time slot n.

The manner in which the present ability to provide desired QoS can be determined, is described below with an example.

7. Present Ability to Provide Desired QoS

In one embodiment, the present ability to provide desired QoS is based on four measurements:
1. waiting time of packets in queues of interest;
2. Depth of queues of interest;
3. the difference between the required data rate and the current data rate and
4. Number of failures to timely transmit packets in a pre-specified prior duration.

Broadly, (1) and (2) are relevant to applications which would require packets to be dropped if not transmitted by corresponding deadlines. On the other hand, (2) and (3) are more relevant in case of data applications characterized by bursty traffic, but with tolerable latencies in transmitting packets.

It should be appreciated that different combinations of above measurements may be used in different scenarios to determine the present ability to meet the QoS requirements. The manner in which the parameters (designed to control the uplink data rate) can be compensated in example scenarios, using combinations of the above measurements, is described below in detail.

8. Compensating Parameters in Scenario 1

In this scenario, mobile station 110A dynamically updates the values of transition probabilities p and q (within certain bounds) for reverse link flows with delay bound requirements based on measurement 1, i.e., waiting time of packets in queues of interest, as described below in further detail.

A single logical queue is created for MAC packets associated with a particular flow in which the MAC packets are stored in ascending order of the value of the term {dbound(m, z)−wait(m,z)[h,n]} with the head-of-line (HOL) packet in the queue being the one with the smallest value of this term. Here dbound and wait terms are as defined in a previous section.

As can be readily seen, the term dbound(m, z)−wait(m, z)[h,n] is a measure of how close a particular MAC packet is to violating its delay bound requirement. Smaller values of this term mean that the corresponding MAC packets need to be transmitted quickly, or else dropped. Accordingly, the transition probabilities p and q for the flow are modified according to the below equations:

$$p_{AT}(m, z)[n] = p(m, z)[n_{prev}] * \Delta_{multi}(m, z)[n] \qquad \text{Equation (1)}$$

Wherein $$\Delta_{multi}(m, z)[n] = \prod_{h=1}^{\max(m,z)} \Delta(m, z)[h, n] \qquad \text{Equation (2)}$$

$$= \frac{dbound(m, z) - wait(m, z)[1, n]}{dbound(m, z)} * \ldots * \frac{dbound(m, z) - wait(m, z)[\max(m, z), n]}{dbound(m, z)}$$

and $\Delta_{multi}(m, z)$ is constrained by:

$$\Delta_{multi}^{low}(m, z) \leq \Delta_{multi}(m, z)[n] \leq \Delta_{multi}^{high}(m, z) \qquad \text{Equation (3)}$$

The lower and upper limits noted above can be pre-specified or computed dynamically based on the policies of service operators.

Similarly, the compensated p value may be bound according to the following equation:

$$\gamma(m, z)*p(m, z)[n_{prev}] \leq p_{AT}(m, z)[n] \leq \beta(m, z)*p(m, z)[n_{prev}] \qquad \text{Equation (4)}$$

Wherein $\gamma(m, z)$ and $\beta(m, z)$ can be pre-specified by an operator or computed dynamically based on policies of the service operators.

The maximum number of entries in the MAC queue (single logical queue referred to above) to be examined may be set according to the following equation:

$$\max(m, z) \leq qdepth\_max(m, z), \forall m, \forall z \qquad \text{Equation (5)}$$

Now the manner in which the q value can be compensated is described. The q value can be compensated according to:

$$q_{AT}(m, z)[n] = q(m, z)[n_{prev}] * \frac{norm\_const\_I(\Delta_{multi})}{\Delta_{multi}(m, z)[n]} \qquad \text{Equation (6)}$$

wherein $norm\_const\_I(\Delta_{multi})$ is a pre-configured normalizing constant (set generally determined based on the operator policies). The remaining terms have been defined above.

$q_{AT}(m, z)[n]$ may be constrained according to:

$$\delta(m, z)*q(m, z)[n_{prev}] \leq q_{AT}(m, z)[n] \leq \alpha(m, z)*q(m, z)[n_{prev}] \qquad \text{Equation (7)}$$

Wherein $\delta(m, z)$ and $\alpha(m, z)$ can be pre-specified by an operator or computed dynamically based on policies of the service operators. The manner in which uplink data rate can be determined based on the compensated p and q values, is described below in further detail.

9. Compensating Parameters in Scenario 2

In this scenario, mobile station dynamically updates the values of transition probabilities p and q (within certain bounds) of reverse link flows with delay bound requirements based on measurements 1 and 2, i.e., waiting time of packets queues of interest and depth of queues of interest, as described below.

Transition probability p can be compensated according to the following equation:

$$p_{AT}(m, z)[n] = p(m, z)[n_{prev}] * \Delta_{multi}(m, z)[n] * \sigma(m, z)[n], \forall m, \forall z, \forall n \qquad \text{Equation (8)}$$

Wherein $\Delta_{multi}$ parameter is defined in previous section(s), and σ parameter is computed according to the following equation:

$$\sigma(m, z)[n] = norm\_const(\sigma) * \left( \frac{qdepth\_max}{tf\_rate\_max} * \frac{tf\_rate(m, z)}{buff(m, z)[n]} \right)^{\eta(m,z)}, \forall m, \forall z \qquad \text{Equation (9)}$$

wherein buff(m, z)[n] represents the queue depth of flow m of mobile station z at the beginning of slot n, qdepth_max(m, z) represents the maximum allowable queue depth (corresponding to flow m) of mobile station z, tf_rate(m, z) represents a pre-specified average rate at which flow m of mobile station z can send data, η(m, z) represents a pre-specified positive constant and depends upon the quality of service (QoS) for that flow and upon policies, such as pricing, of network operators, and norm_const also represents a pre-specified constant. Further Base station generally contains traffic specification and QoS requirements of each flow provisioned on a mobile station and thus can compute these fixed queue depths for each mobile—qdepth_max(m, z) also such information may be provided to base station by the mobile in the session setup signaling.

$$tf\_rate\_max = maximum\{tf\_rate(m, z), \forall m, \forall z\}$$

σ(m, z) is constrained according to:

$$\sigma\_low(m, z) \leq \sigma(m, z)[n] \leq \sigma\_high(m, z) < 1, \forall m, \forall z \qquad \text{Equation (11)}$$

Wherein σ_low(m, z) and σ_high(m, z) are pre-specified constants (determined by operator policies).

The compensated value of p is further constrained according to:

$$\gamma(m, z)*p(m, z)[n_{prev}] \leq p_{AT}(m, z)[n] \leq \beta(m, z)*p(m, z)[n_{prev}] \qquad \text{Equation (12)}$$

wherein $\gamma(m, z)$ and $\beta(m, z)$ can be pre-specified by an operator or computed dynamically based on policies of the service operators.

Similarly, parameter q is compensated according to:

$$q_{AT}(m, z)[n] = q(m, z)[n_{prev}] * \qquad \text{Eq (13)}$$

$$\frac{norm\_const\_I(\Delta_{multi})}{\Delta_{multi}(m, z)[n]} * \frac{norm\_const\_I(\sigma)}{\sigma(m, z)[n]}, \forall m, \forall z, \forall n$$

wherein $\Delta_{multi}(m, z)[n]$ and σ(m, z)[n] are as defined earlier. $norm\_const\_I(\Delta_{multi})$ and $norm\_const\_I(\sigma)$ are pre-specified constants chosen according to the below equations:

$$0 < \frac{norm\_const\_I(\Delta_{multi})}{\Delta_{multi}(m, z)[n]} \leq 1, \forall n, \forall m, \forall z \qquad \text{Equation (14)}$$

$$0 < \frac{norm\_const\_I(\sigma)}{\sigma(m, z)[n]} \leq 1, \forall n, \forall m, \forall z \qquad \text{Equation (15)}$$

The compensated q may be constrained according to:

$$\delta(m, z)*q(m, z)[n_{prev}] \leq q_{AT}(m, z)[n] \leq \alpha(m, z)*q(m, z)[n_{prev}], \forall m, \forall z, \forall n \qquad \text{Eq (16)}$$

wherein $\delta(m, z)$ and $\alpha(m, z)$ can be pre-specified or computed dynamically based on the policies of the service operators.

It should be appreciated that the approach described above can be used when compensation is sought to be attained for a combination of more than one measurement. Various combination of measurements can be used for combination, as would be appropriate under the corresponding scenario.

10. Compensating Parameters in Scenario 3

In this scenario mobile stations are allowed to dynamically update the values of transition probabilities p and q (within certain bounds) of reverse link flows with rate requirements, based on measurement 3, i.e., the difference between the required data rate and the current data rate.

The compensated value of p is computed according to:

$$p_{AT}(m, z)[n] = p(m, z)[n_{prev}] * \mu(m, z)[n] \quad \text{Eq (17)}$$

Wherein $\mu(m, z)[n]$ is computed according to:

$$\mu(m, z)[n] = \frac{reqrate(m, z) - CurrentRate(m, z)[n]}{reqrate(m, z)}, \quad \text{Eq (18)}$$

if $reqrate(m, z) > CurrentRate(m, z)[n]$

Otherwise $\mu(m, z)[n] = 1$ wherein reqrate(m, z) represents the required rate for flow m of mobile station z, and currentRate represents the corresponding current/present rate.

The compensated value of p may be constrained according to:

$$\gamma(m, z) * p(m, z)[n_{prev}] \leq p_{AT}(m, z)[n] \leq \beta(m, z) * p(m, z)[n_{prev}] \quad \text{Eq (19)}$$

wherein the values of $\gamma$ and $\beta$ can be chosen such that equations 22 and 23 noted below are satisfied.

The compensated value of q is computed according to:

$$q_{AT}(m, z)[n] = q(m, z)[n_{prev}] * \frac{\text{norm\_const\_I}(\mu)}{\mu(m, z)[n]}, \forall m, \forall z, \forall n \quad \text{Eq (20)}$$

wherein the values of norm_const_I($\mu$) is a pre-specified normalizing constant (determined based on the operator policies)

The compensated q may be constrained according to:

$$\delta(m, z) * q(m, z)[n_{prev}] \leq q_{AT}(m, z)[n] \leq \alpha(m, z) * q(m, z)[n_{prev}], \forall m, \forall z, \forall n \quad \text{Eq (21)}$$

wherein $\delta(m, z)$ and $\alpha(m, z)$ can be chosen such that equations 22 and 23 are satisfied.

Parameters norm_const_I($\Delta_{multi}$) (in equation 14), norm_const_I($\sigma$) (in equation 15), $\gamma(m, z)$, $\beta(m, z)$, $\delta(m, z)$ and $\alpha(m, z)$ are chosen such that equations 22 and 23 given below are satisfied.

$$p_{AT}(m\_d, z\_d)[n] \leq p_{AT}(m\_r, z\_r), \quad \text{Eq (22)}$$

$$q_{AT}(m\_d, z\_d)[n] \geq q_{AT}(m\_r, z\_r) \quad \text{Eq (23)}$$

wherein $p_{AT}(m\_d, z\_d)$ and $q_{AT}(m\_d, z\_d)$ represent the transition probability parameters p and q respectively of a reverse flow m_d, which has delay bound requirements, and belongs to mobile station z_d, and $p_{AT}(m\_r, z\_r)$ and $q_{AT}(m\_r, z\_r)$ represent the transition probability parameters p and q respectively of a reverse flow m_r, which has rate requirements, and belongs to mobile station z_r.

11. Compensating Parameters in Scenario 4

In this scenario, mobile stations are allowed to dynamically update the values of transition probabilities p and q (within certain bounds) of reverse link flows with delay bound and jitter requirements, based on measurements 1, 2 and 4, i.e., waiting time of packets in queues of interest, depths of queues of interest and the number of failures to timely transmit packets in pre-specified prior duration, as described below.

In this scenario, the transition probability p can be compensated according to the following equation:

$$p_{AT}(m, z)[n] = p(m, z)[n_{prev}] * \mu(m, z)[n] * \eta(m, z)[n] * \sigma(m, z)[n] * \Delta_{multi}(m, z)[n] \quad \text{Eq (24)}$$

wherein $\mu(m, z)[n]$ and $\eta(m, z)[n]$ are computed according to:

$$\mu(m, z)[n] = \frac{\text{norm\_const}(\mu)}{\text{frac\_delay\_viol}(m, z)[n]} \quad \text{Eq (25)}$$

$$\eta(m, z)[n] = \frac{\text{norm\_const}(\eta)}{\text{frac\_djitter\_viol}(m, z)[n]} \quad \text{Eq (26)}$$

$\sigma(m, z)[n]$ and $\Delta_{multi}(m, z)[n]$ are computed as given earlier in equations 9 and 2 respectively.

$\mu(m, z)[n]$ is constrained according to $$\mu_{low}(m, z) \leq \mu(m, z)[n] \leq \mu_{high}(m, z) \quad \text{Eq (27)}$$

$\eta(m, z)[n]$ is constrained according to $$\eta_{low}(m, z) \leq \eta(m, z)[n] \leq \eta_{high}(m, z) \quad \text{Eq (28)}$$

Transition probability q can be compensated according to the following equation:

$$q_{AT}(m, z)[n] = q(m, z)[n_{prev}] * \frac{\text{norm\_const\_I}(\Delta_{multi})}{\Delta_{multi}(m, z)[n]} * \frac{\text{norm\_const\_I}(\sigma)}{\sigma(m, z)[n]} * \frac{\text{norm\_const\_I}(\mu)}{\mu(m, z)[n]} * \frac{\text{norm\_const\_I}(\eta)}{\eta(m, z)[n]} \quad \text{Eq (29)}$$

wherein, norm_const_I($\sigma$), norm_const_I($\Delta_{multi}$), norm_const_I($\mu$) and norm_const_I($\eta$) are normalizing constants (determined based on the operator policies).

Thus, using approaches such as those described above, the transition probabilities can be compensated. The compensated probabilities can then be used to determine the uplink data rates, as described below with an example approach.

12. Determining the Uplink Data Rate

Mobile station 110A may determine the optimal uplink data rate based on the compensated values of transition probabilities p and q, as follows.

At the mobile station a computation of the term CombinedRAbit is done, wherein CombinedRAbit is defined to be the logical OR operation of the most recent RA bits received from all cells. Thus, if excessive interference is detected in any of the cells (as indicated by a 1 of the corresponding RA bit), the combinedRAbit is set to 1.

The uplink data rate can be determined based on the value of CombinedRAbit using the following approach:

When CombinedRAbit has a value 1, the uplink data rate can be determined using:

Note: have changed 9.6 kbps to min_rate below.

$$\text{MaxRate}(m, z)[n] = \max(\text{min\_rate}, \text{CurrentRate}(m, z)/2)$$
with probability $p_{AT}(m, z)[n]$ \quad \text{Eq (30)} or, equivalently:

$$\text{MaxRate}(m, z)[n] = \max(\text{min\_rate}, \text{CurrentRate}(m, z))$$
with probability $(1 - p_{AT}(m, z)[n])$ \quad \text{Eq (31)} wherein:

MaxRate(m, z)[n] is the maximum uplink data rate

CurrentRate(m, z) is the current data rate min_rate is the minimum non-zero data rate at which a mobile is allowed to send data to base station on reverse link. This rate is pre-specified for a wireless system.

That is, from equation 30, the newly determined value of the maximum uplink data rate is the greater of half the current data rate and min_rate, where the probability of this determination is given by the value of the compensated transition probability parameter $p_{AT}(m, z)[n]$.

Equivalently, as represented by equation 31, the newly determined value of the maximum uplink data rate is the greater of the current data rate and min_rate, where the probability of this determination is given by $(1-p_{AT}(m, z)[n])$ where $p_{AT}(m, z)[n]$ is the value of the compensated transition probability parameter p On the other hand, when CombinedRAbit has a value 0:

$$\text{MaxRate}(m, z)[n] = \min(\text{max\_rate}, \text{CurrentRate}(m, z)*2) \text{ with probability } q_{AT}(m, z)[n] \quad \text{Eq (32)}$$

$$\text{MaxRate}(m, z)[n] = \min(\text{max\_rate}, \text{CurrentRate}(m, z)) \text{ with probability } 1-q_{AT}(m, z)[n] \quad \text{Eq (33A)}$$

wherein:

MaxRate(m, z)[n] is the maximum uplink data rate

CurrentRate(m, z) is the current data rate max_rate is the maximum rate at which a mobile station is allowed to send data to a base station.

That is, from equation 32, the newly determined value of the maximum uplink data rate is the lesser of twice the current data rate and 153.6 kbps, where the probability of this determination is given by the value of the compensated transition probability parameter $q_{AT}(m, z)[n]$.

Equivalently, as represented by equation 33A, the newly determined value of the maximum uplink data rate is the lesser of the current data rate and max_rate, where the probability of this determination is given by $(1-q_{AT}(m, z)[n])$ where $q_{AT}(m, z)[n]$ is the value of the compensated transition probability parameter q.

Thus, the four example scenarios presented above illustrate how mobile stations in a network can adjust their uplink data rates by compensating certain parameters based on measurements which indicate present ability to provide a desired QoS. This dynamic adjustment can be made at short intervals (say, of the order of a few milli-seconds).

It should be appreciated that the compensation approaches described above may cause mobile stations 110A-110Z to increase the uplink data rates. To the extent such increases can be supported in the further data path, such increases may be permitted. On the other hand, if the increases cause QoS violations of various flows, it may be desirable to cause mobile stations to reduce the corresponding uplink data rates. The manner in which a base station can compute transition probabilities to support such a feature, is described below.

13. Computation of Transition Probabilities in Base Stations

Base station 120 can compute transition parameters while taking into consideration some of the measurements (but performed for the queues within base station 120) noted above. For example, the computation can take into consideration the fraction of packets of a reverse-link flow (from mobile station towards the application server 190) which have experienced delay, rate or average delay violations, depending on the specific nature of the flow. The computed parameter values can then be transmitted to the mobile stations where the uplink rate determination is done according to the approaches described above.

With respect to computation of the transition probabilities for flows with delay bound requirements, parameters p and q are further recomputed if $$\text{frac\_delay\_viol\_sys}(m, z)(n) > \text{frac\_delay\_viol\_sys\_threshI}(m, z) \quad \text{Eq. (33B)}$$

wherein $$\text{frac\_delay\_viol\_sys\_threshI}(m, z) \quad \text{Equation (33C)}$$

is a pre-specified threshold and $$\text{frac\_delay\_viol\_sys}(m, z)(n) \quad \text{Equation (33D)}$$

is computed according to equation 36 below. Here frac_delay_viol_sys(m, z)(n) is the fraction of packets for reverse link flow m of mobile station z for which delay bound was violated by the beginning of slot n, in the system, that is from the mobile station to base station The compensated value of p is computed according to:

$$p(m, z)[n] = p_{base}(m, z) * \frac{\text{norm\_const\_II}}{\text{frac\_delay\_viol\_norm}(m, z)(n)} \quad \text{Eq (34)}$$

wherein $$\text{frac\_delay\_viol\_norm}(m, z)(n) = \frac{\text{frac\_delay\_viol\_sys}(m, z)(n)}{\text{frac\_delay\_viol\_min}(n)}, \quad \text{Eq. (35)}$$
$$\forall m, \forall z, \forall n$$

$$\text{frac\_delay\_viol\_sys}(m, z)(n) = \frac{\text{Num\_Pkts\_delayviol}(m, z)(n)}{\text{Arr\_Num\_PDSN}(m, z)(n) + \text{Pkt\_Drop\_RAN}(n)} \quad \text{Eq. (36)}$$

wherein Num_Pkts_delayviol(m, z)(n) is the number of IP packets for which delay bound was violated while these packets were queued in the radio access network, Arr_Num_PDSN(m, z)(n) is the number of packets of flow m of mobile station z which arrived at the PDSN, Pkt_Drop_RAN(n) is the number of packets dropped by slot n (time slot at which computation is being performed), norm_const_II is a normalizing constant, and $$\text{frac\_delay\_viol\_min}(n) = \text{minimum}\{\text{frac\_delay\_viol\_sys}(m, z)(n), \forall m, \forall z\} \quad \text{Eq. (36A)}$$

The compensated value of q is computed according to:

$$q(m, z)[n] = q_{base}(m, z) * \frac{\text{frac\_delay\_viol\_norm}(m, z)(n)}{\text{norm\_const\_III}} \quad \text{Eq. (37)}$$

wherein norm_const_III is a normalizing constant.

The recomputed values of p and q are constrained to lie within some pre-specified limits.

With respect to computation of the transition probabilities for flows with rate requirements, transition probabilities p and q are recomputed if $$\text{frac\_rate\_viol\_ran}(m, z)[n] > \text{frac\_rate\_threshI}(m, z)$$

wherein frac_rate_threshI(m, z) is a pre-specified threshold and frac_rate_viol_ran(m, z)[n] is computed according to equation 40 below.

The compensated value of p is computed according to:

$$p(m, z)[n] = p_{base}(m, z) * \frac{norm\_const\_IV}{frac\_rate\_viol\_norm(m, z)[n]} \quad \text{Eq. (38)}$$

wherein $$frac\_rate\_viol\_norm(m, z)[n] = \frac{frac\_rate\_viol\_ran(m, z)[n]}{frac\_rate\_viol\_min[n]}, \quad \text{Eq. (39)}$$
$$\forall m, \forall z, \forall n,$$

$$frac\_rate\_viol\_ran(m, z)[n] = \quad \text{Eq. (40)}$$
$$\frac{reqrate(m, z) - observedRate(m, z)[n]}{reqrate(m, z)},$$
$$\text{if } reqrate(m, z) > observedRate(m, z)[n],$$
$$\text{otherwise } frac\_rate\_viol\_ran(m, z)[n] = 1$$

$$frac\_rate\_viol\_min[n] = \text{minimum}\{frac\_rate\_viol\_ran(m, z)[n], \forall m, \forall z, \forall n\} \quad \text{Eq. (41)}$$

wherein reqrate(m, z) is the required rate of flow m of mobile station z, observedRate(m, z)[n] is the observed rate of flow m of mobile station z by the beginning of slot n.

norm_const_IV is a normalizing constant

The compensated value of q is computed according to:

$$q(m, z)[n] = q_{base}(m, z) * \frac{frac\_rate\_viol\_norm(m, z)[n]}{norm\_const\_V} \quad \text{Eq. (42)}$$

wherein norm_const_V is a normalizing constant.

The compensated values of p and q are constrained to lie within some pre-specified limits With respect to computation of the transition probabilities for flows with average delay requirements, transition probability parameters p and q are recomputed if $$frac\_avgdelay\_viol(m, z)[n] > frac\_avgdelay\_viol\_threshI(m, z) \quad \text{Eq. (42A)}$$

wherein frac_avgdelay_viol_threshI(m, z) is a pre-specified threshold and frac_avgdelay_viol(m, z)[n] is computed according to equation 44 below.

The compensated value of p is computed according to:

$$p(m, z)[n] = p_{base}(m, z) * \frac{norm\_const\_VI}{frac\_avgdelay\_viol(m, z)[n]} \quad \text{Eq. (43)}$$

wherein $$frac\_avgdelay\_viol(m, z)[n] = \quad \text{Eq. (44)}$$
$$\frac{observedavgdelay(m, z)[n]}{reqavgdelay(m, z)} \text{ if } reqavgdelay(m, z) <$$

-continued $observedavgdelay(m, z)[n]$ Otherwise, $$frac\_avgdelay\_viol(m, z)[n] = 1.$$

reqavgdelay(m, z) is the required average delay for flow m of mobile station z. observedavgdelay(m, z)[n] is the observed average delay of flow m of mobile station z by the beginning of slot n, in the radio access network, and norm_const_VI is a normalizing constant The compensated value of q is computed according to:

$$q(m, z)[n] = q_{base}(m, z) * \frac{frac\_avgdelay\_viol(m, z)[n]}{norm\_const\_VII} \quad \text{Eq. (45)}$$

wherein norm_const_VII is a normalizing constant

The compensated values of p and q are constrained to lie within some pre-specified limits.

14. Example Implementation of Base Station

Figure 4:
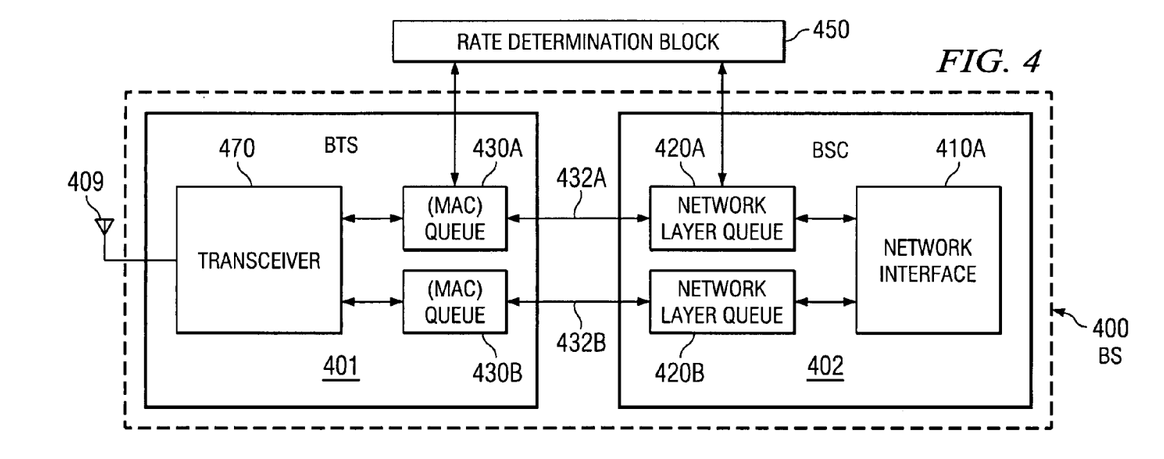
FIG. 4 is a block diagram illustrating the details of a base station in one embodiment.

FIG. 4 is a block diagram illustrating the details of a base station in one embodiment. The base station is shown containing base terminal station (BTS 401), base station control (BSC)center 402 and rate determination block 460. Further BTS 401 is shown containing transceiver 470 and MAC layer queues 430A and 430B; BSC 402 is shown containing network layer queues 420A and 420B and network interface 410. Each block is described below in further detail.

Transceiver 470 receives MAC packets from multiple mobile stations and sends the received MAC packets to appropriate MAC layer queue 430A or 430B. Each MAC layer queue 430A and 430B may contain a transmit queue and a receive queue. Accordingly, transceiver 470 may send MAC packets received from mobile stations to the receive queue and may transmit a MAC packets in the transmit queue received from BSC 402.

BSC 402 accesses MAC layer queue on paths 432A and 432B, and combines the data in multiple MAC packets to generate a corresponding network layer (IP) packet. The IP packets are stored in network layer queues 420A/420B. Paths 432A and 432B may represent various communication channels such as RF, cable, OFC etc. Network interface 410 forwards the IP packets in the queues to the next device (e.g., PSTN) or to an IP network, as appropriate.

Rate determination block 450 examines the data (e.g., packet headers, queue lengths) in the queues (MAC layer queues 430A and 430B, and network layer queues 420A and 420B) to determine various parameters defining the QoS requirements, and dynamically adjusts the transition probabilities based on the determined parameters. As both MAC and network layer queues are being examined, rate determination block 450 may be implemented in a distributed manner, as logically represented in the Figure.

In an embodiment, the parameters include a number of packets violating a delay bound requirement (maximum permissible delay in transporting the packet to the destination), average delay being experienced in the corresponding flow in a desired duration, and the data flow rate for the corresponding flow. The equations noted above are used to determine the transition probabilities p and q. The determined probabilities are then transmitted to the mobile stations by interfacing MAC layer queues 430A and 430B.

The delay requirement may be measured using one of various techniques. For example, in TCP/IP environments, the source application devices may be configured to include a time stamp in the TCP header of each packet, and the time stamp can be used to determine the delay experienced by the packet thus far. Various GPS type technologies can be used to synchronize clocks (at the source of the packets and the base stations) to accurately determine the delay values. The PDSN may look at transport layer packet headers and send this information back to the rate determination block 450.

The average delay may also be computed from the measured delay by considering a number of packets over a desired duration. Similarly, rate determination block 450 may check the data flow rate for each flow based on the number of network/IP packets or the aggregate payload lengths being transported by the packets.

Due to the use of such techniques, the transition probabilities can also be optimally computed according to various aspects of the present invention. It should also be appreciated that various features described above can be implemented in a combination of one or more of hardware, software and firmware. The description is continued with respect to an embodiment in which the features are operative upon execution of appropriate software instructions from a machine readable medium.

15. Machine Readable Medium

Figure 5:
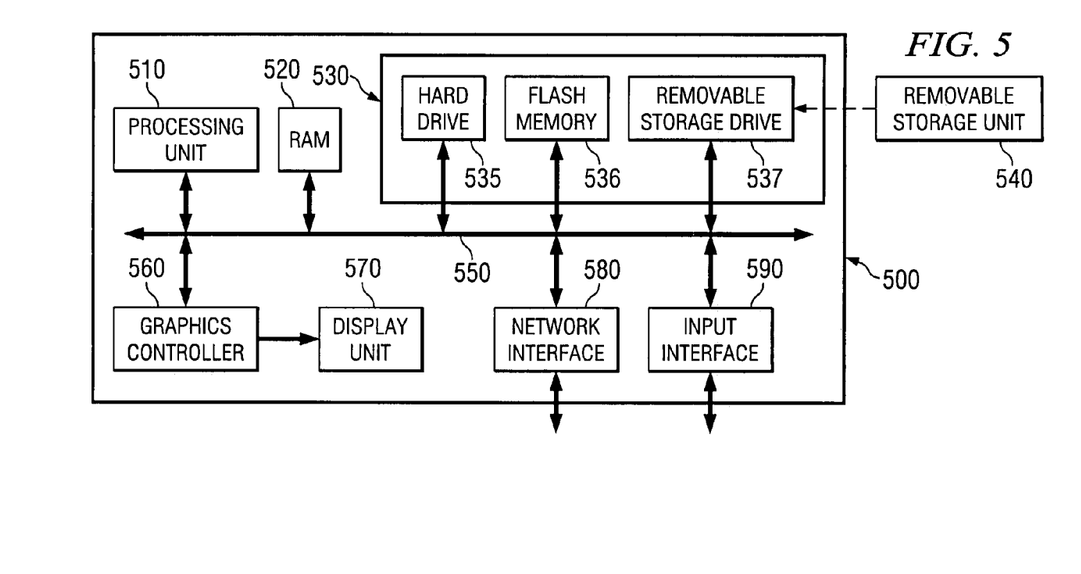
FIG. 5 is a block diagram of an example system, in which several aspects of the present invention are operable by the execution of software instructions, in an embodiment of the present invention.

FIG. 5 is a block diagram of computer system 500 illustrating an example system in an embodiment of the present invention. System 500 may correspond to each of a portion of a base station and a mobile station. Computer system 500 may contain one or more processors such as central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 represents an embedded processor such as DSP (digital signal processing) processors, ARM processor etc., well known in the relevant arts, and may execute instructions stored in RAM 520 to provide several features of the present invention. For example, the mobile station may examine parameters such as delay values and queue lengths, and determine the transition probabilities based on the QoS requirement as described above. Base station may compute the transition probabilities as described above.

CPU 510 may contain multiple processing units, with each processing unit potentially being designed for a specific task. For example, a DSP processor may implement MAC layer queue 330A and 330B. An ARM processor may perform task of Network layer queue and applications. In the case of a mobile station, CPU 510 may contain only a single processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a key_board and/or mouse, and generally enables a user to provide inputs. Network interface 580 contains various antennas and other interfaces needed to communicate with external devices.

Secondary memory 530 may contain hard drive 531, flash memory 536 and removable storage drive 537. Secondary storage 530 may store the software instructions and data, which enable computer system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD_ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. An embodiment of the present invention is implemented using software running (that is, executing) in computer system 500.

In this document, the term "computer program product" is used to generally refer to removable storage unit 540 or hard disk installed in hard drive 531. These computer program products are means for providing software to computer system 500. As noted above, CPU 510 may retrieve the software instructions, and execute the instructions to provide various features of the present invention.

16. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of providing an optimal uplink data rate from a mobile station to a mobile network, said method being performed in said mobile station, said method comprising:

receiving a plurality of parameters originating from said mobile network, with the parameters being designed to control said uplink data rate in said mobile station;

calculating one or more compensation terms according to the present ability to meet the QoS requirements of individual applications executing on said mobile station;

compensating said plurality of parameters based on said one or more compensation terms to form compensated parameter values; and computing said optimal uplink data rate according to the compensated parameter values, wherein said computing is performed after said compensating.

2. The method of claim 1, wherein said plurality of parameters compensated by said compensating comprise a first transition probability (p) and a second transition probability (q), wherein p indicates a probability with which said uplink data rate can be decreased and q indicates a probability with which said uplink data rate can be increased.

3. The method of claim 2, wherein the compensated value of each of said first transition probability and said second transition probability is constrained by an upper bound and a lower bound.

4. The method of claim 1, further comprising buffering in a queue a plurality of packets of a corresponding flow, wherein said queue contains packets of said flow not yet transmitted to said mobile network, wherein said calculating comprises:

measuring a difference of a wait time of each of said plurality of packets and the corresponding delay bound requirement, wherein said delay bound requirement indicates a maximum amount of time the packet can be buffered in said queue; and setting said one or more compensation terms to respective values such that said compensating would increase said uplink data rate based on said difference to meet said delay bound requirement.

5. The method of claim 4, wherein said plurality of parameters comprise a first transition probability (p) and a second transition probability (q) for said flow, wherein respective compensation terms for p and q, included in said one or more compensation terms, are computed based on said difference, wherein p indicates a probability with which said uplink data rate can be decreased and q indicates a probability with which said uplink data rate can be increased;

compensating p and q according to respective compensation terms; and determining said uplink data rate for said flow based on a compensated p and a compensated q.

6. The method of claim 5, wherein said compensated p is computed according to:

$$p_{AT}(m, z)[n] = p(m, z)[n_{prev}] * \Delta_{multi}(m, z)[n]$$

wherein $p_{AT}(m, z)[n]$ represents the compensated first transition probability for flow m of mobile station z at a beginning of slot n, $p(m, z)[n_{prev}]$ represents a value of the first transition probability received in a slot prior to n for flow m of mobile station z, and $\Delta_{multi}(m, z)[n]$ represents a compensation term and is computed according to:

$$\Delta_{multi}(m, z)[n] = \prod_{h=1}^{\max(m,z)} \Delta(m, z)[h, n]$$

$$= \frac{dbound(m, z) - wait(m, z)[1, n]}{dbound(m, z)} * \ldots * \frac{dbound(m, z) - wait(m, z)[\max(m, z), n]}{dbound(m, z)}$$

wherein wait(m, z)[1,n] represents the duration of time that a packet h of flow m of mobile station z has been in its queue by the beginning of time slot n, wherein dbound(m, z) represents the delay bound requirement of reverse link flow (m) of mobile station (z).

7. The method of claim 5, wherein said compensated q is computed according to:

$$q_{AT}(m, z)[n] = q(m, z)[n_{prev}] * \frac{\text{norm\_const\_I}(\Delta_{multi})}{\Delta_{multi}(m, z)[n]}$$

wherein $q_{AT}(m, z)[n]$ represents the compensated queue for flow m of mobile station z at time slot n, $q(m, z)[n_{prev}]$ represents a value of the second transition probability received in a slot prior to n for flow m of mobile station z, and norm_const_I($\Delta_{multi}$) represents a normalizing constant.

8. The method of claim 1, further comprising buffering in a queue a plurality of packets of a corresponding flow, wherein said queue contains packets of said flow not yet transmitted to said mobile network, wherein said calculating comprises:

measuring a queue depth of each said plurality of queues; and setting said one or more compensation terms to respective values such that said compensating would increase said uplink data rate based on said queue depths.

9. The method of claim 8, wherein said plurality of parameters comprise a first transition probability (p) and a second transition probability (q), wherein respective compensation terms for p and q, included in said one or more compensation terms, are computed based on said queue depths, wherein p indicates a probability with which said uplink data rate can be decreased and q indicates a probability with which said uplink data rate can be increased;

compensating p and q according to the respective compensation terms; and computing said uplink data rate based on said compensated p and said compensated q.

10. The method of claim 9, wherein said compensated p is computed according to:

$$p_{AT}(m, z)[n] = p(m, z)[n_{prev}] * \Delta_{multi}(m, z)[n] * \sigma(m, z)[n], \forall m, \forall z, \forall n$$

wherein $p_{AT}(m, z)[n]$ represents the compensated first transition probability for flow m of mobile station z at a beginning of slot n, $p(m, z)[n_{prev}]$ represents a value of the first transition probability received in a slot prior to n for flow m of mobile station z, $\sigma(m, z)[n]$ represents a compensation term computed according to:

$$\sigma(m, z)[n] = \text{norm\_const}(\sigma) * \left(\frac{\text{qdepth\_max}}{\text{tf\_rate\_max}} * \frac{\text{tf\_rate}(m, z)}{\text{buff}(m, z)[n]}\right)^{\eta(m,z)}, \forall m, \forall z$$

wherein buff(m, z)[n] represents the queue depth of flow m of mobile station z at the beginning of slot n, qdepth_max represents the maximum allowable queue depth corresponding to flow m of mobile station z, tf_rate(m, z) represents a pre-specified average rate at which flow m of mobile station Z can send data~, (m, z) and norm_const represent pre-specified positive constants.

11. The method of claim 9, wherein compensated q is computed according to:

$$q_{AT}(m, z)[n] = q(m, z)[n_{prev}] * \frac{\text{norm\_const\_I}(\Delta_{multi})}{\Delta_{multi}(m, n)[n]} * \frac{\text{norm\_const\_I}(\sigma)}{\sigma(m, n)[n]},$$

$$\forall m, \forall z, \forall n$$

wherein $q_{AT}(m, z)[n]$ represents the compensated q for flow m of mobile station z at time slot n, $q(m, z)[n_{prev}]$ represents a value of the second transition probability received in a slot prior to n for flow m of mobile station z, and norm_const_I($\Delta_{multi}$) represents a normalizing constant.

12. The method of claim 1, further comprising buffering in a queue a plurality of packets for each of a plurality of flows, wherein each of said plurality of flow has an associated one of a plurality of rate requirements, wherein said queue contains packets of said plurality of flows not yet transmitted to said mobile network, wherein said calculating comprises:

measuring a difference of the current data rate and the corresponding required data rate of each of said plurality of flows; and setting said one or more compensation terms to respective values such that said compensating would adjust said uplink data rate based on said measured differences.

13. The method of claim 12, wherein said plurality of parameters comprise a first transition probability (p) and a second transition probability (q), wherein p indicates a probability with which said uplink data rate can be decreased and q indicates a probability with which said uplink data rate can be increased;

wherein respective compensation terms for p and q, included in said one or more compensation terms, are computed based on said measured differences, compensating p and q according to the respective compensation terms; and determining said uplink data rate based on said compensated p and said compensated q.

14. The method of claim 13, wherein said compensated p is computed according to:

$$p_{AT}(m, z)[n] = p(m, z)[n_{prev}] * \mu(m, z)[n]$$

wherein $p_{AT}(m, z)[n]$ represents the compensated first transition probability for flow m of mobile station z at a beginning of slot n, $p(m, z)[n_{prev}]$ represents a value of the first transition probability received in a slot prior to n for flow m of mobile station z, and $\mu(m, z)[n]$ represents a compensation term computed according to:

$$\mu(m, z)[n] = \frac{reqrate(m, z) - CurrentRate(m, z)[n]}{reqrate(m, z)},$$

if $reqrate(m, z) > CurrentRate(m, z)[n]$

Otherwise, $\mu(m, z)[n]=1$ wherein reqrate(m, z) represents the required rate for flow m of mobile station z, and currentRate represents the corresponding current/present rate.

15. The method of claim 13, wherein said compensated q is computed according to:

$$q_{AT}(m, z)[n] = q(m, z)[n_{prev}] * \frac{\text{norm\_const\_I}(\mu)}{\mu(m, z)[n]}, \forall m, \forall z, \forall n$$

wherein $q_{AT}(m, z)[n]$ represents the compensated q for flow m of mobile station z at time slot n, $q_{AT}(m, z)[n]$ represents a value of the second transition probability received in a slot prior to n for flow m of mobile station z, and wherein norm_const_I($\mu$) represents a pre-specified normalizing constant.

16. The method of claim 1, further comprising buffering in a queue a plurality of packets of a corresponding flow, wherein said queue contains packets of corresponding flow not yet transmitted to said mobile network, wherein said calculating comprises:

measuring a number of failures to timely transmit packets in a pre-specified prior duration; and setting said one or more compensation terms to respective values such that said compensating would adjust said uplink data rate based on said number of failures.

17. The method of claim 16, wherein said plurality of parameters comprise a first transition probability (p) and a second transition probability (q), wherein p indicates a probability with which said uplink data rate can be decreased and q indicates a probability with which said uplink data rate can be increased;

wherein respective compensation terms for p and q, included in said one or more compensation terms, are computed based on said number of failures, compensating p and q according to the respective compensation terms; and determining said uplink data rate based on said compensated p and said compensated q.

18. The method of claim 17, wherein p is computed according to:

$$p_{AT}(m, z)[n] = p(m, z)[n_{prev}] * \mu(m, z)[n] * \eta(m, z)[n] * \sigma(m, z)[n] * \Delta_{multi}(m, z)[n]$$

wherein $p_{AT}(m, z)[n]$ represents the compensated first transition probability for flow m of mobile station z at a beginning of slot n, $p(m, z)[n_{prev}]$ represents a value of the first transition probability received in a slot prior to n for flow m of mobile station z, and $\mu(m, z)[n]$ is computed according to:

$$\mu(m, z)[n] = \frac{\text{norm\_const}(\mu)}{\text{frac\_delay\_viol}(m, z)[n]}$$

wherein norm_const($\mu$) represents a constant, and frac_delay_viol represents a fraction of packets for which delay bound has been violated, wherein $\sigma(m, z)[n]$ is computed according to $$\sigma(m, z)[n] = \text{norm\_const}(\sigma) * \left(\frac{\text{qdepth\_max}}{\text{tf\_rate\_max}} * \frac{\text{tf\_rate}(m, z)}{\text{buff}(m, z)[n]}\right)^{\eta(m,z)}, \forall m, \forall z$$

wherein buff(m, z)[n] represents the queue depth of flow m of mobile station z at the beginning of slot n, qdepth_max represents the maximum allowable queue depth corresponding to flow m of mobile station z, tf_rate(m, z) represents a pre-specified average rate at which flow m of mobile station Z can send data~, (m, z) and Norm_const represents pre-specified positive constant, and wherein $\eta(m, z)[n]$ is computed according to:

$$\eta(m, z)[n] = \frac{\text{norm\_const}(\eta)}{\text{frac\_djitter\_viol}(m, z)[n]}$$

wherein frac_djitter_viol represents a fraction of packets for which delay jitter has been violated.

19. The method of claim 18, wherein compensated q is computed according to:

$$q_{AT}(m, z)[n] = q(m, z)[n_{prev}] * \frac{\text{norm\_const\_I}(\Delta_{multi})}{\Delta_{multi}(m, z)[n]} * \frac{\text{norm\_const\_I}(\sigma)}{\sigma(m, z)[n]} * \frac{\text{norm\_const\_I}(\mu)}{\mu(m, z)[n]} * \frac{\text{norm\_const\_I}(\eta)}{\eta(m, z)[n]}$$

wherein $q_{AT}(m, z)[n]$ represents the compensated q for flow m of mobile station z at time slot n, $q(m, z)[n_{prev}]$ represents a value of the second transition probability received in a slot prior to n for flow m of mobile station z, norm_const_I($\sigma$), norm_const_I($\Delta_{multi}$), norm_const_I($\mu$) and norm_const_I($\eta$) are normalizing constants.

20. A computer readable medium carrying one or more sequences of instructions to cause a mobile station to determine an optimal uplink data rate from said mobile station to a mobile network, wherein execution of said one or more sequences of instructions by one or more processors contained in said mobile station causes said one or more processors to perform the actions of:

receiving a plurality of parameters originating from said mobile network, with the parameters being designed to control said uplink data rate in said mobile station;

calculating one or more compensation terms according to the present ability to meet the QoS requirements of individual applications executing on said mobile station;

compensating said plurality of parameters based on said one or more compensation terms to form compensated parameter values; and computing said optimal uplink data rate according to the compensated parameter values, wherein said computing is performed after said compensating.

21. The computer readable medium of claim 20, wherein said plurality of parameters comprise a first transition probability (p) and a second transition probability (q), wherein p indicates a probability with which said uplink data rate can be decreased and q indicates a probability with which said uplink data rate can be increased.

22. The computer readable medium of claim 21, wherein the compensated value of each of said first transition probability and said second transition probability is constrained by an upper bound and a lower bound.

23. The computer readable medium of claim 20, further comprising buffering in a queue a plurality of packets of a corresponding flow, wherein said queue contains packets of said flow not yet transmitted to said mobile network, wherein said determining comprises:

measuring a difference of a wait time of each of said plurality of packets and the corresponding delay bound requirement, wherein said delay bound requirement indicates a maximum amount of time the packet can be buffered in said queue;

adjusting said uplink data rate based on said difference.

24. The computer readable medium of claim 23, wherein said adjusting comprises:

computing a compensation term for each of a first transition probability (p) and a second transition probability (q) for said flow, wherein p indicates a probability with which said uplink data rate can be decreased and q indicates a probability with which said uplink data rate can be increased;

compensating p and q according to respective compensation terms; and determining said uplink data rate for said flow based on a compensated p and a compensated q.

25. A method of providing an optimal uplink data rate from a mobile station to a mobile network, said method being performed in said mobile station, said method comprising:

receiving a plurality of parameters originating from said mobile network, with the parameters being designed to control said uplink data rate in said mobile station;

forming a plurality of packets of a corresponding flow, each flow corresponding to one of a plurality of applications executing in said mobile station;

buffering said plurality of packets in a queue prior to transmission to said mobile network;

calculating one or more compensation terms according to a status of packets buffered in said queue and awaiting transmission;

compensating said plurality of parameters based on said one or more compensation terms to form compensated parameter values; and computing said optimal uplink data rate according to the compensated parameter values.

26. The method of claim 25, wherein said plurality of parameters comprise a first transition probability (p) and a second transition probability (q) for said flow, wherein p indicates a probability with which said uplink data rate can be decreased and q indicates a probability with which said uplink data rate can be increased.

* * * * *